(12) United States Patent
Fiss et al.

(10) Patent No.: US 11,421,753 B2
(45) Date of Patent: Aug. 23, 2022

(54) DRIVE BELT AND METHOD FOR THE PRODUCTION THEREOF

(71) Applicant: ContiTech Antriebssysteme GmbH, Hannover (DE)

(72) Inventors: Tim Fiss, Hannover (DE); Manfred Bonkowski, Wedemark (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 360 days.

(21) Appl. No.: 16/648,249

(22) PCT Filed: Jun. 11, 2018

(86) PCT No.: PCT/EP2018/065250
§ 371 (c)(1),
(2) Date: Apr. 16, 2020

(87) PCT Pub. No.: WO2019/063143
PCT Pub. Date: Apr. 4, 2019

(65) Prior Publication Data
US 2020/0256423 A1      Aug. 13, 2020

(30) Foreign Application Priority Data
Sep. 29, 2017   (DE) .................... 10 2017 217 484.6

(51) Int. Cl.
*F16G 5/20*      (2006.01)
*F16G 1/28*      (2006.01)
(Continued)

(52) U.S. Cl.
CPC ................. *F16G 5/20* (2013.01); *F16G 1/28* (2013.01); *B29K 2021/00* (2013.01);
(Continued)

(58) Field of Classification Search
CPC ..... F16G 3/10; F16G 3/12; F16G 3/14; F16G 3/06; F16G 3/00
(Continued)

(56) References Cited

U.S. PATENT DOCUMENTS 1,474,774 A * 11/1923 Fuller ..................... B29C 66/49
24/38
1,728,673 A * 9/1929 Driver .................... B24D 11/06
451/531
(Continued)

FOREIGN PATENT DOCUMENTS

CN         101558251 A     10/2009
DE     102006007509 A1     8/2007
(Continued)

OTHER PUBLICATIONS

International Search Report dated Sep. 24, 2018 of the PCT application PCT/EP2018/065250 on which this application is based on.

*Primary Examiner* — Henry Y Liu
(74) *Attorney, Agent, or Firm* — Gregory Adams; David L. Cate

(57) ABSTRACT

The invention relates to a drive belt for a traction mechanism drive, having a radially externally arranged top layer (4) composed of a fiber-containing elastomer or of an elastomer comprising a fiber mesh, having a radially centrally arranged tension member layer (6) composed of a wound tension strand or a plurality of circumferentially oriented tension strands, and a radially internally arranged substructure (8) composed of an elastomer, wherein at least one wedge-shaped rib is integrally formed in the substructure (8), a coating layer (10) composed of a circumferentially open fiber mesh being applied to the outer surfaces of said wedge-shaped rib. In order to prevent an abrupt change in the friction coefficient at the force-transmitting flanks of the ribs, provision is made for the circumferential ends (12, 14)

(Continued)

of the coating layer (10) and a parting joint (16), which is filled by the elastomer of the substructure (8), between said circumferential ends (12, 14) of the coating layer (10) to be covered with a transverse strip (18) composed of a vulcanizable material, wherein said vulcanizable material has a reduced friction coefficient in relation to the elastomer of the substructure (8).

19 Claims, 1 Drawing Sheet

(51) Int. Cl.
  *B29K 21/00* (2006.01)
  *B29L 31/00* (2006.01)
  *B66B 7/06* (2006.01)
  *F16G 5/08* (2006.01)
(52) U.S. Cl.
  CPC ....... *B29L 2031/7094* (2013.01); *B66B 7/062* (2013.01); *F16G 5/08* (2013.01)
(58) Field of Classification Search
  USPC .................................................. 474/255, 256
  See application file for complete search history.

(56) References Cited

U.S. PATENT DOCUMENTS

| | | | | |
|---|---|---|---|---|
| 2,039,258 A * | 4/1936 | Patterson | ................ | B29C 35/06 474/271 |
| 2,158,007 A * | 5/1939 | Ellis | ................ | D06F 83/00 38/68 |
| 3,076,736 A * | 2/1963 | McHugh | ................ | F16G 3/10 24/31 B |
| 3,224,566 A * | 12/1965 | Elliott | ................ | F16G 3/10 156/137 |
| 3,481,807 A * | 12/1969 | Kanamori | ................ | F16G 3/10 198/844.2 |
| 3,593,840 A * | 7/1971 | Guyer | ................ | B65G 15/38 428/215 |
| 3,693,218 A * | 9/1972 | Jaubert | ................ | F16G 3/10 198/844.2 |
| 3,981,206 A * | 9/1976 | Miranti, Jr. | ................ | F16G 5/20 474/271 |
| 4,031,766 A * | 6/1977 | Beck | ................ | F16G 7/00 474/256 |
| 4,031,767 A * | 6/1977 | Guyer | ................ | B29C 66/721 474/256 |
| 4,034,617 A * | 7/1977 | Guyer | ................ | F16G 3/10 198/844.2 |
| 4,035,872 A * | 7/1977 | MacBean | ................ | F16G 3/02 24/DIG. 37 |
| 4,050,322 A * | 9/1977 | Moring | ................ | F16G 3/10 474/261 |
| 4,289,820 A * | 9/1981 | Blessing | ................ | B29C 43/22 428/125 |
| 4,563,379 A * | 1/1986 | Kruger | ................ | E04D 5/06 428/59 |
| 4,650,446 A * | 3/1987 | Pinto | ................ | B29D 29/08 474/253 |
| 4,671,834 A * | 6/1987 | Price | ................ | B29C 66/723 156/304.3 |
| 4,828,538 A * | 5/1989 | Razien | ................ | F16G 7/06 474/256 |
| 4,944,716 A * | 7/1990 | Graff | ................ | F16G 3/02 24/33 C |
| 5,015,220 A * | 5/1991 | Legge | ................ | D21F 1/0054 474/261 |
| 5,083,985 A * | 1/1992 | Alles | ................ | F16G 3/10 474/253 |
| 5,092,823 A * | 3/1992 | Longo | ................ | F16G 1/00 474/253 |
| 5,224,905 A * | 7/1993 | Mishima | ................ | F16G 1/28 474/271 |
| 5,344,369 A * | 9/1994 | Kitahama | ................ | F16G 1/28 474/253 |
| 5,425,985 A * | 6/1995 | Irvin | ................ | B65G 15/34 428/57 |
| 5,484,342 A * | 1/1996 | Beck | ................ | F16G 3/10 474/256 |
| 5,773,114 A * | 6/1998 | Adams | ................ | F16G 3/10 428/59 |
| 5,942,301 A * | 8/1999 | Schlueter, Jr. | ...... | B29C 66/2274 428/58 |
| 5,961,760 A * | 10/1999 | Tajima | ................ | F16G 5/06 156/304.6 |
| 6,436,502 B1 * | 8/2002 | Swift | ................ | B29C 65/48 474/254 |
| 6,612,955 B2 * | 9/2003 | Daugherty | ................ | F16G 5/20 156/137 |
| 8,262,523 B2 * | 9/2012 | Kanzow | ................ | D04B 21/18 474/268 |
| 8,640,862 B2 * | 2/2014 | Perrin | ................ | B65G 15/34 198/847 |
| 8,663,521 B2 * | 3/2014 | Frey | ................ | F16G 3/10 198/844.2 |
| 10,060,506 B2 * | 8/2018 | Kanzow | ................ | F16G 5/08 |
| 2002/0072445 A1 * | 6/2002 | Daugherty | ................ | F16G 5/20 474/263 |
| 2003/0078125 A1 * | 4/2003 | Knutson | ................ | F16G 1/28 474/263 |
| 2004/0121868 A1 * | 6/2004 | Gregg | ................ | F16G 3/10 474/256 |
| 2006/0163042 A1 * | 7/2006 | Vogt | ................ | F16G 3/10 198/844.1 |
| 2010/0025200 A1 * | 2/2010 | Fandella | ................ | F16G 3/02 198/850 |
| 2010/0167860 A1 * | 7/2010 | Mori | ................ | D03D 15/49 474/252 |
| 2013/0062168 A1 * | 3/2013 | Frey | ................ | F16G 3/02 198/844.2 |
| 2017/0204937 A1 * | 7/2017 | Marchetti | ........... | B29C 66/7292 |
| 2018/0043644 A1 * | 2/2018 | Higuchi | ................ | D21F 9/00 |
| 2019/0226271 A1 * | 7/2019 | Briese | ................ | E06B 3/66352 |

FOREIGN PATENT DOCUMENTS

| | | |
|---|---|---|
| DE | 102007042917 A1 | 3/2009 |
| EP | 0481652 A2 | 4/1922 |
| WO | 0246642 A2 | 6/2002 |

* cited by examiner

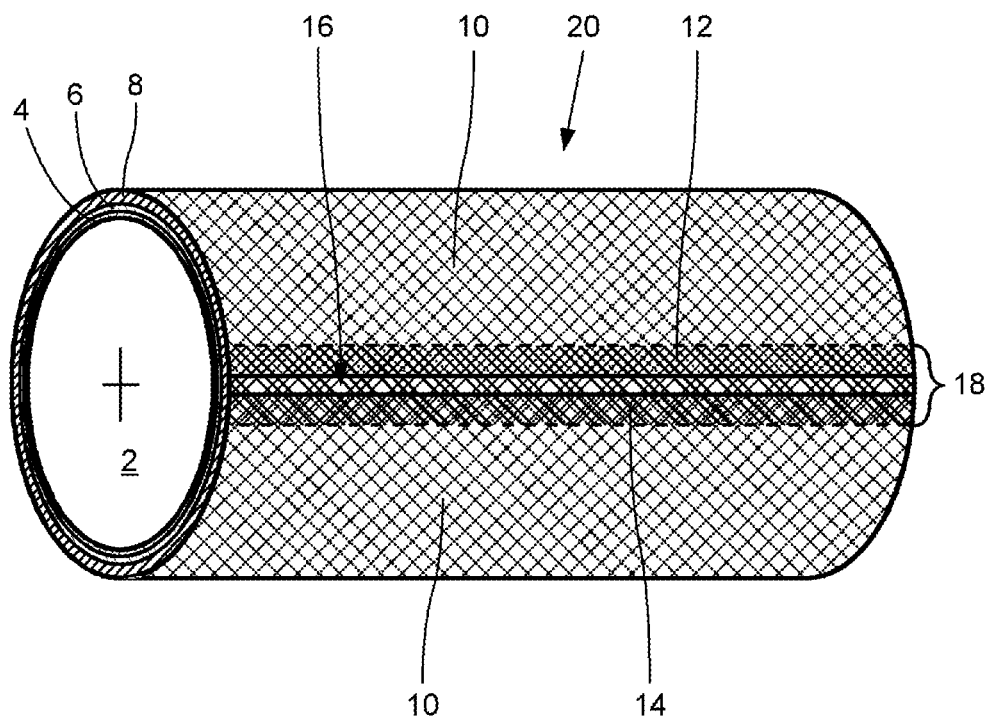

DRIVE BELT AND METHOD FOR THE PRODUCTION THEREOF

The invention relates to a drive belt for a traction mechanism drive, having a radially externally arranged top layer composed of a fiber-containing elastomer or of an elastomer comprising a fiber mesh, having a radially centrally arranged tension member layer composed of a wound tension strand or a plurality of circumferentially oriented tension strands, and a radially internally arranged substructure composed of an elastomer, wherein at least one wedge-shaped rib is integrally formed in the substructure, a coating layer composed of a circumferentially open fiber mesh being applied to the outer surfaces of said wedge-shaped rib. The invention also relates to a method for producing a drive belt of this kind.

In traction mechanism drives, drive belts are used for frictional force transmission between at least two belt pulleys. Therefore, for example in an auxiliary train of a motor vehicle, a drive belt, which is in the form of a V-belt or a V-ribbed belt, is usually used for driving at least one electrical generator. In that instance, the drive belt is deflected by means of at least one deflection roller and tensioned by means of a tensioning roller, which deflection roller and tensioning roller are each in contact with the drive belt on the top layer of the drive belt. The fibers comprised in the top layer or the fiber mesh comprised in said top layer serve/serves to increase the resistance to wear, to damp noise and to reduce the friction with the drive rollers. Similarly, the coating layer composed of a fiber mesh, said coating layer being applied to the outer surfaces of the at least one rib, also serves to increase the resistance to wear, to damp noise and to reduce the friction with the belt pulleys.

Corresponding V-ribbed belts, in which a coating layer comprising a fiber mesh composed of different fibers or fiber blends is applied to each of the outer surfaces of the ribs, are known, for example, from
U.S. Pat. No. 3,981,206 A, DE 10 2006 007 509 B4 and DE 10 2007 042 917 A1.

During the production of drive belts of this kind, the layers of a belt coil comprising a plurality of drive belts are applied to a belt building drum in a radially reversed order. Since the belt building drum is mounted in a rotatable manner, the fiber mesh of the coating layer is usually not cut out of a circumferentially closed fabric hose which is advantageous per se, but rather from a fabric roll. The length of the cut fiber mesh corresponds to the outside diameter of the substructure which was previously applied to the belt building drum. During the vulcanization process, the ribs are pressed into the substructure, which is covered with the fiber mesh, by an appropriately contoured vulcanization mold. After vulcanization and cooling, the drive belts are cut from the belt coil by being cut off and are converted into their ready-to-install form by being turned inside out.

Heating and pressing the ribs into the substructure of the belt blank during the vulcanization process necessarily produces a more or less wide parting joint between the circumferential ends of the coating layer, which parting joint is filled by the elastomer of the substructure. This produces a transverse strip with an increased friction coefficient on each of the frictionally force-transmitting flanks of the ribs. The friction coefficient which is increased in relation to the regions which are at a distance from the parting joint is caused by the increased amount of elastomer of the substructure present in the region of the parting joint. The increased friction coefficient leads to the occurrence of high, locally limited shear stresses during subsequent use. Undesired operating noise can be produced in the region of the parting joint as a consequence of these shear stresses.

The object of the present invention was therefore to propose a drive belt of the type mentioned in the introductory part, in which drive belt the abrupt change in the friction coefficient at the force-transmitting flanks of the ribs is prevented. A method for producing a drive belt of this kind is also intended to be described.

The object in respect of the drive belt is achieved in conjunction with the features of the preamble of claim 1 in that the circumferential ends of the coating layer and a parting joint, which is filled by the elastomer of the substructure, between said circumferential ends of the coating layer are covered with a transverse strip composed of a vulcanizable material, wherein said vulcanizable material has a reduced friction coefficient in relation to the elastomer of the substructure.

The invention accordingly proceeds from a drive belt, which is known per se, for a traction mechanism drive, which drive belt has a radially externally arranged top layer composed of a fiber-containing elastomer or of an elastomer comprising a fiber mesh, a radially centrally arranged tension member layer composed of a wound tension strand or a plurality of circumferentially oriented tension strands and a radially internally arranged substructure composed of an elastomer. At least one wedge-shaped rib is integrally formed in the substructure of the drive belt, a coating layer composed of a fiber mesh which is open in the circumferential direction being applied to the outer surfaces of said wedge-shaped rib.

In order to prevent an abrupt change in the friction coefficient at the force-transmitting flanks of the ribs of the drive belt, the circumferential ends of the coating layer and the parting joint, which is filled by elastomer of the substructure, between the circumferential ends of the coating layer are covered with a transverse strip composed of a vulcanizable material with a reduced friction coefficient. Therefore, the occurrence of high shear stresses in the region of the parting joint between the circumferential ends of the coating layer and consequently the production of undesired operating noise in said region is prevented during subsequent use.

The material of the transverse strip is preferably a two-component nitrile foam (2K-NFT), the friction coefficient, resistance to wear and damping properties of which correspond largely to the corresponding values of the customary coating layers.

For the purpose of finely adjusting the friction coefficient and the damping properties, the transverse strip can additionally be flocked with a fiber material, as a result of which the friction coefficient will be further reduced and the noise damping will be further increased.

The object in respect of the method for producing a drive belt is achieved by the following method steps:
a) applying a top layer composed of a fiber-containing elastomer or of an elastomer comprising a fiber mesh to a belt building drum,
b) wrapping the top layer with a tension strand or a plurality of circumferentially oriented tension strands for forming a tension member layer,
c) applying a substructure composed of an elastomer to the tension member layer,
d) applying a coating layer composed of a circumferentially open fiber mesh to the substructure,
e) applying a transverse strip composed of a vulcanizable material with a reduced friction coefficient in relation to the elastomer of the substructure to the circumferential ends of the coating layer and the parting joint between the circumferential ends of the coating layer, f) removing the belt blank from the belt building drum and inserting said belt blank into a heatable vulcanization mold, g) vulcanizing the belt blank so as to integrally form ribs into the substructure, the coating layer and the transverse strip of the belt blank, h) after cooling then extracting the belt blank from the vulcanization mold, and i) cutting off drive belts from the belt blank and turning the drive belts inside out.

The material of the transverse strip, said material being viscous before vulcanization and a two-component nitrile foam (2K-NFT) preferably being used for it, can be applied by means of a roller or by being sprayed on.

For the purpose of finely adjusting the friction coefficient and the damping properties, the transverse strip, after it is applied, can additionally be flocked with a fiber material.

A drawing of an exemplary embodiment is appended to the description in order to further explain the invention. In said drawing, the single FIGURE shows a schematic view of a belt coil 20, which has not yet been vulcanized, on a belt building drum 2, from which belt coil a plurality of drive belts can be cut after vulcanization.

A top layer 4 composed of a fiber-containing elastomer or an elastomer comprising a fiber mesh, a tension member layer 6 comprising a tension strand or a plurality of circumferentially oriented tension strands, and a substructure 8 composed of an elastomer are applied to the belt building drum 2 as seen radially from the inside to the outside. A coating layer 10 composed of a fiber mesh which is open in the circumferential direction is applied to the substructure 8 into which the ribs of a plurality of belt drives are pressed during subsequent vulcanization. The coating layer 10 therefore has two axially parallel and immediately adjacent ends 12, 14.

In order to prevent an abrupt increase in the friction coefficient owing to the elastomer of the substructure 8, said elastomer being situated on the outside in the parting joint 16 between the two circumferential ends 12, 14 of the coating layer 10, said region is covered with a closed transverse strip 18 composed of a vulcanizable material. Said material of the transverse strip 18 has a reduced friction coefficient in relation to the elastomer of the substructure 8.

The material of the transverse strip 18, said material preferably being a two-component nitrile foam (2K-NFT), is applied by means of a roller or by being sprayed on in such a way that the circumferential ends 12, 14 of the coating layer 10 and the parting joint 16, which is filled by the elastomer of the substructure 8, are covered with the vulcanizable material with a reduced friction coefficient.

After vulcanization and cooling, a plurality of drive belts are cut off from the belt coil 20 which is formed from the top layer 4, the tension member layer 6, the substructure 8 and the coating layer 10 as well as the transverse strip 18 and are converted into their ready-to-install form by being turned inside out.

Since the friction coefficient, the resistance to wear and the damping properties of the nitrile foam (NFT) largely correspond to the corresponding values of the coating layer 10, high, locally limited shear stresses no longer occur at the frictionally force-transmitting flanks of the drive belts during operation. As a result, the production of undesired operating noise is prevented in the traction mechanism drives in question.

LIST OF REFERENCE SIGNS

Part of the Description

2 Belt building drum
4 Top layer
6 Tension member layer
8 Substructure
10 Coating layer, fiber mesh
12 First circumferential end of the substructure
14 Second circumferential end of the substructure
16 Parting joint
18 Transverse strip
20 Belt coil

The invention claimed is:

1. A drive belt coil for a traction mechanism drive, the drive belt coil comprising:
    a radially externally arranged top layer comprising of a fiber-containing elastomer;
    a radially arranged substructure comprising an elastomer;
    a coating layer comprising a circumferentially open fiber mesh being applied to an outer surface of the radially arranged substructure, the coating layer having circumferential ends defining a parting joint; and
    a transverse strip comprising a vulcanizable material and having a reduced friction coefficient in relation to the radially arranged substructure.

2. The drive belt coil as claimed in claim 1, wherein the vulcanizable material of the transverse strip is a two-component nitrile foam (2K-NFT).

3. The drive belt coil as claimed in claim 1, wherein the vulcanizable material of the transverse strip is flocked with a fiber material.

4. The drive belt coil of claim 1, wherein the fiber-containing elastomer has a radially centrally arranged tension member layer.

5. The drive belt coil of claim 4, wherein the radially centrally arranged tension member layer is composed of a wound tension strand, and/or a plurality of circumferentially oriented tensions strands.

6. The drive belt coil of claim 1, wherein the parting joint exposes filled elastomer of the radially arranged substructure.

7. The drive belt coil of claim 1, further comprising a plurality of individual drive belts cut off from the drive belt coil after vulcanization.

8. The drive belt coil of claim 7, wherein the plurality of individual drive belts have a rib surface on an outside.

9. The drive belt coil of claim 1, wherein the coating layer exposes an outer surface of a portion of the radially arranged substructure between the circumferential ends.

10. The drive belt coil of claim 1, further comprising at least one wedge-shaped rib formed in the substructure.

11. A method of producing a drive belt for a traction mechanism drive, the method comprising:
    applying a fiber containing elastomer to a belt building drum;
    wrapping a plurality of tension strands around the applied elastomer to form a tension member layer;
    applying an elastomer to the tension member layer to form a radially arranged substructure;
    applying a coating layer having a fiber mesh to the radially arranged substructure and defining a parting joint; and
    applying a vulcanizable material over the parting joint to form a transverse strip.

12. The method of claim 11, wherein applying the coating layer comprises forming a first end and a second end of the coating layer to define the parting joint.

13. The method of claim 11, further comprising removing a belt blank having the transverse strip and the substructure from the belt building drum and inserting the belt blank into a vulcanization mold.

14. The method of claim 13, further comprising vulcanizing the belt blank to form a plurality of ribs in the substructure, the coating layer and the transverse strip.

15. The method of claim 14, further comprising cutting a plurality of drive belts from the belt blank after removing the vulcanized belt blank from the mold.

16. The method of claim 11, wherein the transverse strip comprises a two-component nitrile foam (2K-NFT).

17. The method of claim 11, wherein applying the vulcanizable material comprises rolling the vulcanizable material onto the parting joint.

18. The method of claim 11, wherein applying the vulcanizable material comprises spraying the vulcanizable material onto the parting joint.

19. The method of claim 11, further comprising flocking the vulcanizable material with a fiber material after applying the vulcanizable material.

* * * * *